J. P. SMALL.
CORN SHELLER.
Patented July 21, 1835.
8986X
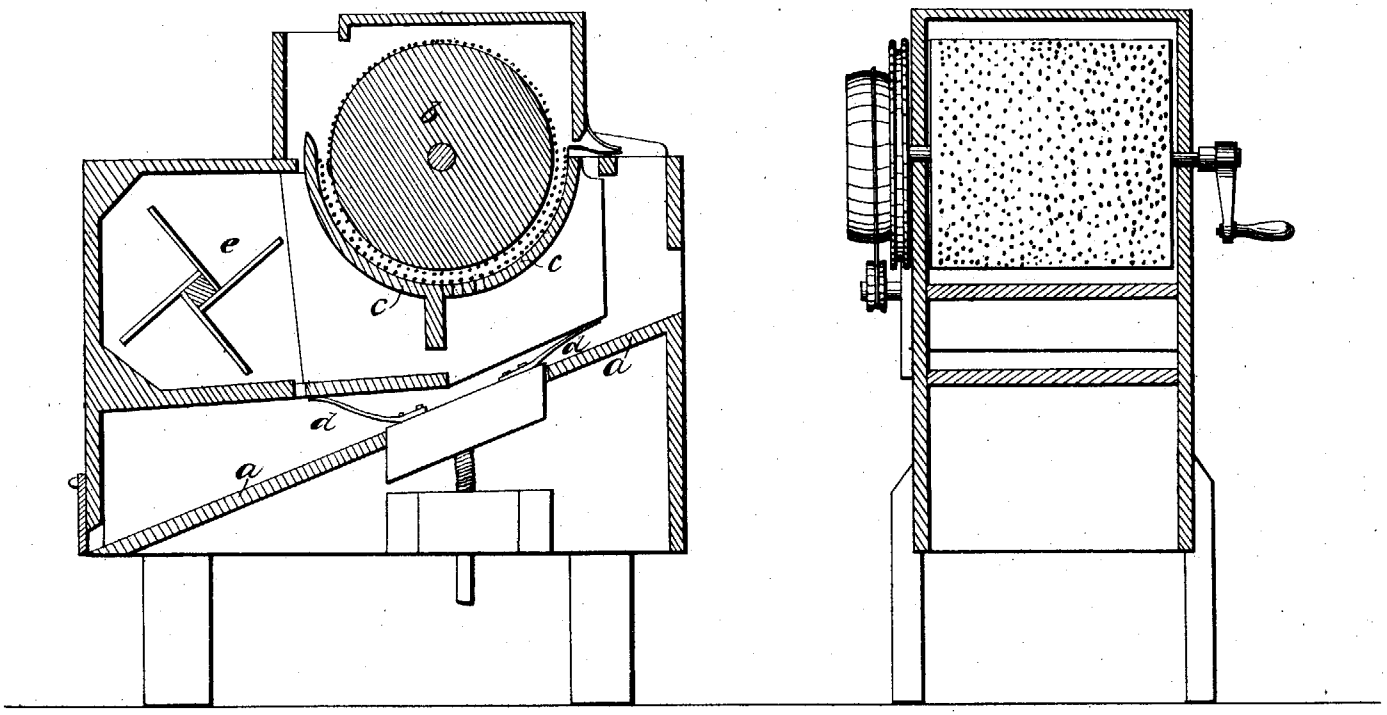
THE NORRIS PETERS CO., PHOTO-LITHO., WASHINGTON D. C.

July 21, 1835

8986X John P. [illegible] of Gilmanton New Hampshire

Letters Patent.

The Schedule referred to in these Letters Patent and making part of the same
containing a description in the words of the said John Page [illegible] himself
of his improvement in a Machine for Shelling Corn.

To all to whom these Presents shall come. Be it known that I John
Page [illegible] of Gilmanton in the county of Strafford and State of New
Hampshire have invented a new and useful machine for threshing the
[illegible] Corn, or separating it from the Cob and the chaff, and that
the following is a full and exact description thereof. The frame of the
machine is a box 2 feet 7 inches long 14 inches wide and 20 inches
deep; the bottom slanting forward and furnished at the lower end with
a slide through which the corn is received after being separated from the
cob and chaff. Immediately above the bottom the after end of the box is
open in order to suffer the chaff to be winnowed out. A block of wood
(in form a truncated cone, but so slightly conical that for brevity sake
it may be box termed a cylinder) is suspended by its axis upon the sides
of the box as near as possible to the after end. Its diameter is about 11
inches, and its length such as to occupy the entire space between the
sides of the box. It is furnished with eight rows of small square flat
headed teeth running its length spirally, and revolves within a shell
placed beneath it in the box, of equal length corresponding with its shape
and embracing about one half of its circumference. The shell is likewise
furnished with rows of teeth running spirally but in a direction to cross
those on the cylinder. It rests on two steel springs affixed one upon
each side of the box, by means of which it is pressed upward to the cylin-
der, or is suffered to yield to accommodate the size of the ears of corn and
the cobs which are to pass between it and the cylinder. Over the cylinder
is a cap fastened to the box by hooks and staples, with an aperture near
the fore part. near the fore part, which admits the ears of corn; which
by the revolution of the cylinder being forced down between it and the shell
the corn and cob separated by their attrition, the former dropping down

8986 X through holes at the bottom part of the shell. The latter being carried around
by the motion of the cylinder and the iron back between the after edge of
the shell and of the cup which is made sharp to cut their passage out and
fortified with iron. This opening is guarded by leather to prevent the
escape of the kernels of corn. In the forward and upper part of the
box is a chamber containing a revolving fan set in motion by a band
from a wheel on the axis of the cylinder. The chamber opens immediately un-
der the holes in the shell through which the corn falls and there the chaff
is blown off through the opening before mentioned in the after end of the
box. The whole motion is produced by a crank affixed to the axis of
the cylinder. The box is supported by legs of [illegible] inches long. What I claim as
my invention and not before known in the above described machine is the
combination or manner in which I have put together the several parts
in the manner above described. In testimony that the above is a full
and exact description of the construction and mode of operation of my
machine as invented or improved by me I have hereunto set my hand
this twelfth day of June eighteen hundred and thirty five.

[illegible]
[illegible] Witnesses
David B. Moore
Samuel Cole

John H. Small

[illegible]